Nov. 23, 1926.  
C. L. BEST  
TRACKLAYING TRACTOR  
Filed Sept. 7, 1922

Witness:  
Jas. E. Hutchinson

Inventor:  
Clarence Leo Best  
By Milans & Milans  
Attorneys

Nov. 23, 1926.                                       1,607,940
                   C. L. BEST.
              TRACKLAYING TRACTOR
            Filed Sept. 7, 1922     3 Sheets-Sheet 2

Inventor
Clarence Leo Best,

Witness:
Jas. E. Hutchinson

By Milans & Milans.  Attorneys.

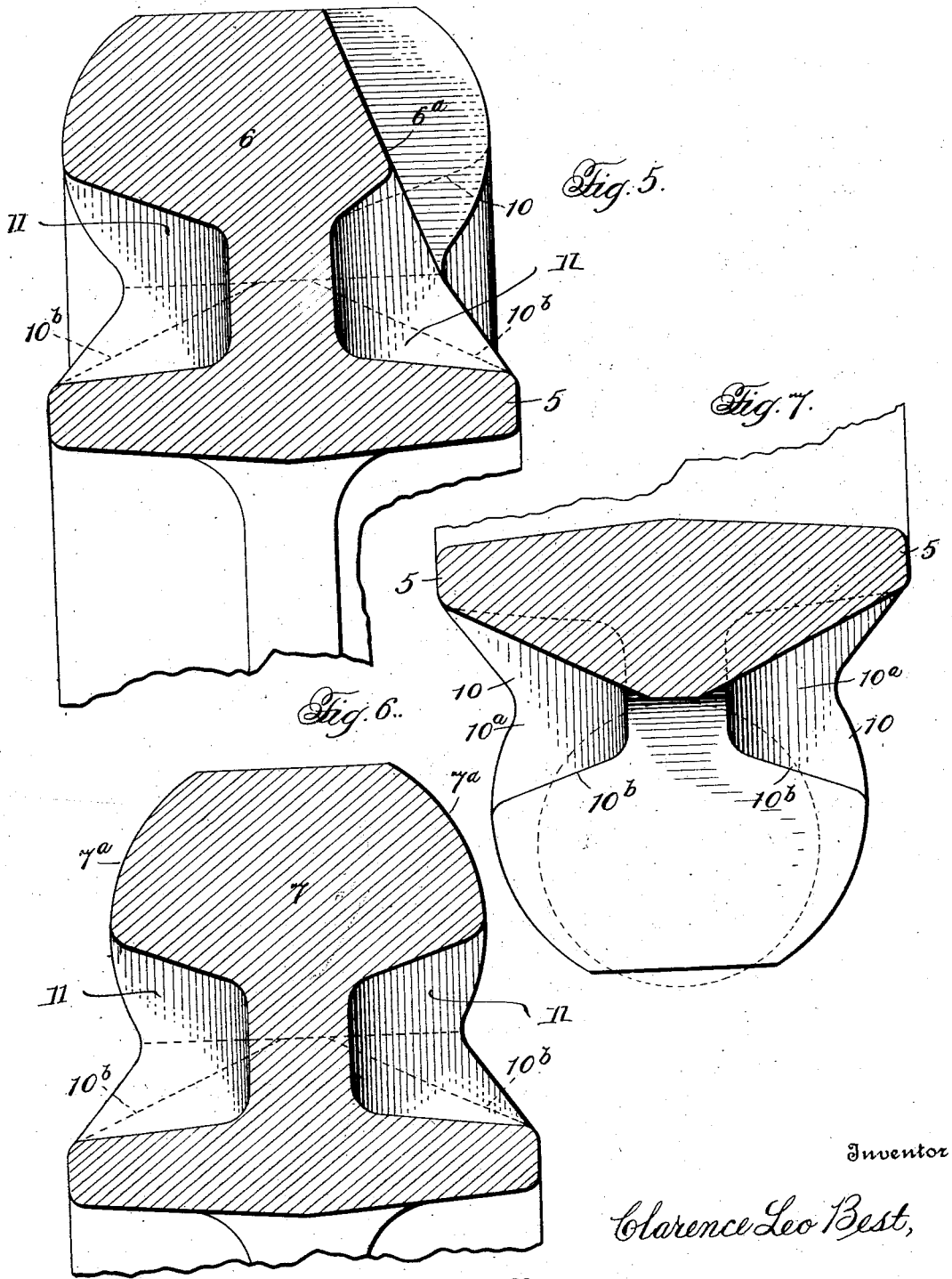

Patented Nov. 23, 1926.

1,607,940

UNITED STATES PATENT OFFICE.

CLARENCE LEO BEST, OF SAN LEANDRO, CALIFORNIA, ASSIGNOR, BY MESNE ASSIGNMENTS, TO CATERPILLAR TRACTOR CO., OF SAN LEANDRO, CALIFORNIA, A CORPORATION OF CALIFORNIA.

TRACKLAYING TRACTOR.

Application filed September 7, 1922. Serial No. 586,707.

This invention relates to improvements in track laying tractors, and more especially to an improved sprocket wheel for the link treads or belts thereof.

A serious difficulty experienced in the operation of track laying tractors is clogging of the sprocket wheels over which the link treads run, this resulting in the breaking of the tightener boxes, springing of the axles, and in some cases buckling of the frame. The object of the present invention is to overcome this difficulty, to provide an improved efficient relatively light strong sprocket wheel structure which will be self cleaning, that will present less surface for the accumulation of dirt, and that will act to shed and force the dirt therefrom.

The invention with other objects and advantages thereof, and the particular construction, combination and arrangement of parts comprising the same, will be understood from the hereinafter contained detail description, when considered in connection with the accompanying drawings, forming part hereof, and illustrating one embodiment of the invention.

In the drawings:

Fig. 5 is a transverse section on the line 5—5 Fig. 4.

Fig. 6 is a transverse section on the line 6—6 of Fig. 4.

Fig. 7 is a transverse section on the line 7—7 of Fig. 4.

Figure 1:
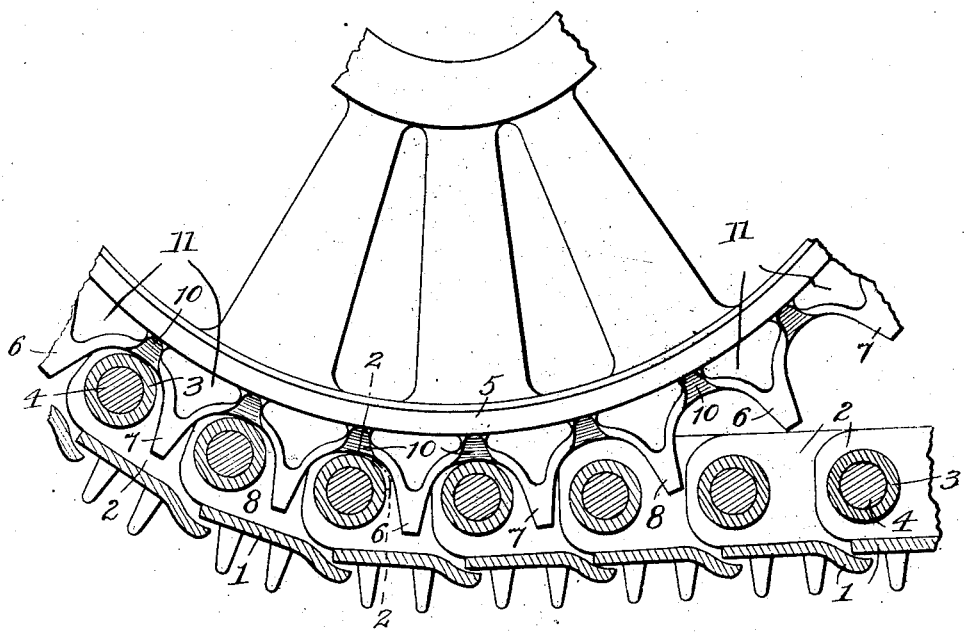
Figure 1 is a side elevation of a section of a sprocket wheel construction in accordance with the present invention, the wheel being shown engaging a portion of a link tread.
Figure 2:
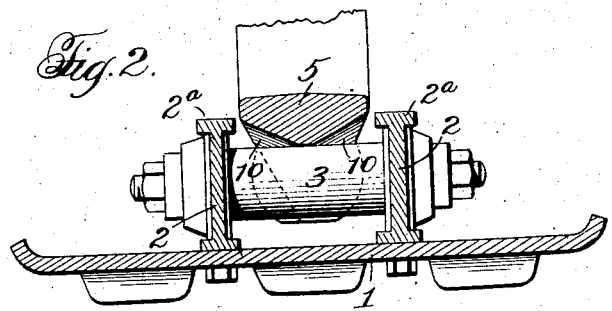
Fig. 2 is a section taken on the line 2—2 of Figure 1.
Figure 3:
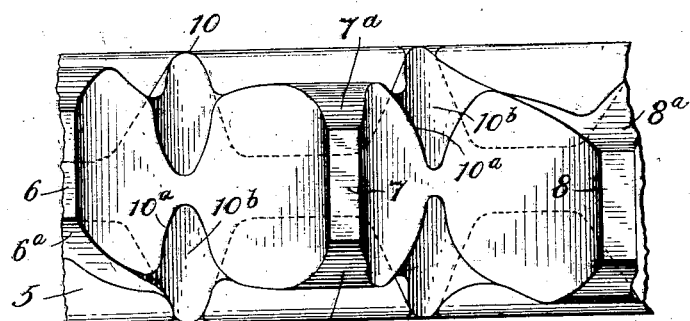
Fig. 3 is a detail plan view, on an enlarged scale, of a section of the outer portion of the sprocket wheel.
Figure 4:
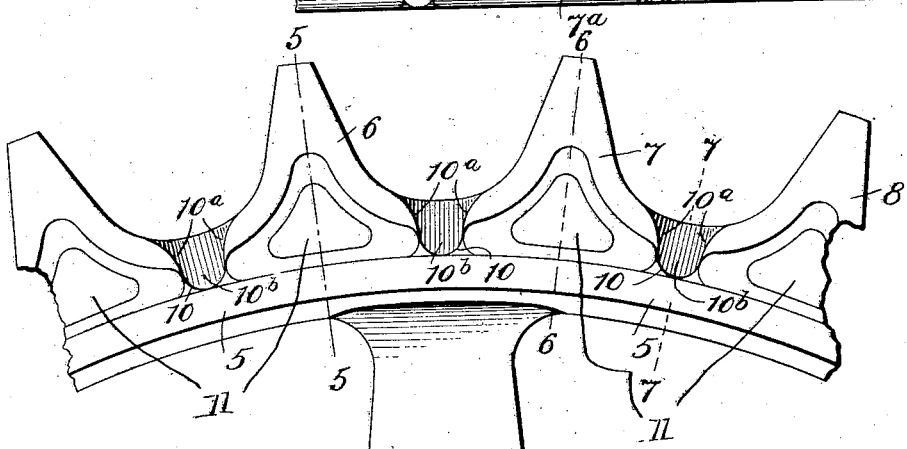
Fig. 4 is a side elevation, on an enlarged scale, of a portion of the sprocket wheel.

In the drawings is illustrated a portion of one of the well known forms of link of treads for track laying tractors made up of link members pivotally connected together, each link member comprising a tread plate 1, spaced side plates 2, 2, provided with upper track bars 2ª, a sleeve 3 at one end, and a pin or strut 4 at the other end. The link members are arranged in overlapping relation, as shown, with the pins or struts 4 engaging the sleeves 3, the latter being adapted to engage between the teeth of the sprocket wheel.

The invention comprehends an improved sprocket wheel having teeth arranged in staggered relation, the teeth being relatively narrow and of less width than the sleeves or sprocket engaging members 3 of the link tread, whereby less surface is presented for the accumulation of dirt and increased space about the teeth is provided to permit the dirt to drop therefrom. At the same time an efficient engagement of the teeth with the sprocket engaging members 3 of the tread over substantially the entire length of said members is afforded. The invention also contemplates providing the teeth with inclined faces which act to force out the dirt, and in the provision of relief or vent openings at the bottom of the sprocket spaces.

In the exemplification of my improved wheel illustrated in the drawings, the wheel has a rim 5, substantially of rectangular shape in cross section and a plurality of teeth 6, 7, and 8 of general inverted V-shaped form providing the usual sprocket formation to be engaged by the sleeves or sprocket engaging members 3 of the link treads. The teeth are relatively narrow, of less width than the sprocket engaging members 3 of the link treads and are arranged in staggered relation. By this special arrangement less surface is presented by the teeth for the accumulation of dirt, and a more open structure with increased space about the teeth is provided to facilitate the loosening and dropping of the dirt from the teeth.

As hereinbefore intimated the invention also contemplates providing the teeth with inclined outer side faces sloping outwardly to the side of the wheel, which act to shed and forcibly eject dirt therefrom. In the particular construction shown, the teeth are arranged in regular order in series of threes across the rim 5, and alternate teeth 6, 8 are respectively provided with abruptly inclined outer side faces 6ª, 8ª, sloping outwardly toward opposite sides of the wheel. The intermediate teeth 7 taper toward their outer ends, having curved side faces 7ª.

10 designates relief or vent openings leading from the sprocket spaces for letting out mud or dirt from the bottom of the sprocket spaces. Two of such relief openings are provided at each sprocket, said relief openings extending from near the central part of the adjoining portions of adjacent teeth outwardly to opposite sides of the wheel and having outwardly sloping side and bottom walls 10ª, 10ᵇ. Each tooth near its base is provided with a substantially triangular shaped reduced portion forming openings 11 therein at opposite sides adjoining the relief openings 10, this further contributing to a light open structure which at the same time will possess the required strength.

It will be noted that the special construction, hereinbefore described, provides for an efficient engagement between the teeth of the sprocket wheel over substantially the entire length of the sprocket engaging members of the link chain and at the same time the structure is of a more open nature to prevent clogging. Less surface is presented by the teeth for the accumulation of dirt, increased space is provided about the teeth by the staggered arrangement thereof, and the inclined outer side faces of the teeth serve to shed and forcibly eject the dirt laterally therefrom. The relief openings provide a free passage for dirt and mud from the sprocket spaces at the base thereof. The relief openings extend from near the central part of the adjoining portions of adjacent teeth so that said adjoining portions are relatively narrow and act to shed the dirt or mud to either side thereof. The wheel while possessing these open characteristics providing for the elimination of the dirt and mud therefrom, is designed to give the required strength. The particular form and arrangement of the teeth also functions, as will be understood, to loosen and remove dirt from the spaces in the links of the chain tread.

What I claim is:

1. In a track laying tractor, the combination with a link tread, each link of the link tread including a single pair of spaced side members with transverse sprocket engaging members extending between the same, of a sprocket wheel to cooperate with the link tread, said sprocket wheel being provided with teeth having outer portions of substantially less width than the distance between the side members of the links and the length of the transverse sprocket engaging members of the link tread, and arranged in staggered relation, said outer portions of the teeth of the sprocket wheel together engaging over substantially the entire active surface lengthwise of the transverse sprocket engaging members of the chain.

2. In a track laying tractor, the combination with a link tread, each link of the tread including a pair of spaced side members with transverse sprocket engaging members extending between the same, said sprocket wheel being provided with teeth having outer portions of substantially less width than the distance between the side members of the links of the tread and the length of the transverse sprocket engaging members of the link tread, and arranged in staggered relation, some of the teeth of the sprocket wheel having opposing outer side faces sloping outwardly from the outer ends of the teeth toward opposite sides of the wheel at a different pitch from each other.

3. In a track laying tractor, the combination with a link tread, each link of the tread including a pair of spaced side members with transverse sprocket engaging members extending between the same, said sprocket wheel being provided with teeth having outer portions of substantially less width than the distance between the side members of the links of the tread, and the length of the transverse sprocket engaging members of the link tread, and alternate teeth of the sprocket wheel having outer side face portions sloping outwardly from the outer ends of the teeth toward one side of the wheel at a different pitch from each other.

4. In a track laying tractor, the combination with a link tread, each link of the tread including a pair of spaced side members with transverse sprocket engaging members extending between the same, said sprocket wheel being provided with teeth having outer portions of substantially less width than the distance between the side members of the links of the tread and the length of the transverse sprocket engaging members of the link tread, some of the teeth of the sprocket wheel having one outer side face portion extending from the outer end of the tooth outwardly toward one side of the wheel in a gradual slope, and at the other side having a face portion extending from the outer end of the tooth outwardly at an abrupt inclination to one side of the wheel.

5. In a track laying tractor, the combination with a link tread, each link of the tread including a pair of spaced side members with transverse sprocket engaging members extending between the same, said sprocket wheel being provided with teeth having outer portions of substantially less width than the distance between the side members of the links of the tread and the length of the transverse sprocket engaging members of the link tread, some of the teeth of the sprocket wheel having one outer side face portion extending from the outer end of the tooth outwardly toward one side of the wheel in a gradual slope, and at the other side having a face portion extending from the outer end of the tooth outwardly at an abrupt inclination to one side of the wheel, some of said abruptly outwardly sloping outer side face portions of the teeth being disposed at one side of the wheel and others at the opposite side of the wheel.

In testimony whereof I hereunto affix my signature.

CLARENCE LEO BEST.